(12) United States Patent
Cheng (10) Patent No.: US 11,106,885 B2
(45) Date of Patent: Aug. 31, 2021

(54) TOUCH PANELS WITH FINGERPRINT IDENTIFICATION FILM LAYER AND TOUCH DEVICES

(71) Applicant: Yungu (Gu'an) Technology Co., Ltd., Langfang (CN)

(72) Inventor: Yun Cheng, Jiangsu (CN)

(73) Assignee: Yungu (Gu'an) Technology Co., Ltd., Hebei (CN)

( * ) Notice: Subject to any disclaimer, the term of this patent is extended or adjusted under 35 U.S.C. 154(b) by 0 days.

(21) Appl. No.: 16/913,368

(22) Filed: Jun. 26, 2020

(65) Prior Publication Data

US 2020/0327294 A1   Oct. 15, 2020

Related U.S. Application Data

(63) Continuation-in-part of application No. PCT/CN2018/096868, filed on Jul. 24, 2018.

(30) Foreign Application Priority Data

Dec. 29, 2017   (CN) .......................... 201711485114.X (51) Int. Cl.
   *G06K 9/00*    (2006.01)
   *G06F 3/041*   (2006.01)
   *G06F 3/046*   (2006.01)
   *G09G 3/20*    (2006.01)

(52) U.S. Cl.
   CPC ............ *G06K 9/0002* (2013.01); *G06F 3/046* (2013.01); *G06F 3/0412* (2013.01); *G09G 3/2003* (2013.01)

(58) Field of Classification Search
   CPC ..... G06K 9/0002; G06F 3/0412; G06F 3/046; G06F 3/0446; G09G 3/2003
   See application file for complete search history.

(56) References Cited

U.S. PATENT DOCUMENTS

| | | | |
|---|---|---|---|
| 2011/0096027 A1* | 4/2011 | Jeon | G06F 3/0412 345/175 |
| 2014/0047706 A1 | 2/2014 | Shaikh et al. | |
| 2016/0350570 A1* | 12/2016 | Han | G06F 3/04164 |
| 2016/0364593 A1* | 12/2016 | Lee | G06F 3/04164 |
| 2017/0147850 A1* | 5/2017 | Liu | G06F 3/0412 |
| 2017/0293378 A1* | 10/2017 | Ahn | G06F 3/0445 |
| 2017/0336909 A1* | 11/2017 | Song | G06K 9/00013 |
| 2018/0039349 A1* | 2/2018 | Han | G06F 3/04164 |
| 2018/0068156 A1* | 3/2018 | Jang | G06K 9/0002 |
| 2019/0018540 A1* | 1/2019 | Ko | G06F 3/0445 |
| 2019/0065717 A1* | 2/2019 | Won | G06F 21/32 |
| 2019/0189970 A1* | 6/2019 | Ye | G06F 3/0412 |

FOREIGN PATENT DOCUMENTS

| | | |
|---|---|---|
| CN | 104035626 A | 9/2014 |
| CN | 204557429 U | 8/2015 |
| CN | 106775129 A | 5/2017 |

(Continued)

*Primary Examiner* — Premal R Patel
(74) *Attorney, Agent, or Firm* — BakerHostetler (57) ABSTRACT

The disclosure provides a touch panel and a touch device. The touch panel includes a touch film layer and a fingerprint identification film layer. The touch film layer includes at least one preset hollow. An orthographic projection of the fingerprint identification film layer on the touch film layer is located in at least one preset hollow area.

12 Claims, 5 Drawing Sheets

(56) References Cited

FOREIGN PATENT DOCUMENTS

| | | | |
|---|---|---|---|
| CN | 106802747 | A | 6/2017 |
| CN | 106997252 | A | 8/2017 |
| CN | 107402680 | A | 11/2017 |
| CN | 107425041 | A | 12/2017 |
| CN | 108052229 | A | 5/2018 |
| CN | 108196735 | A | 6/2018 |
| TW | M513411 | U | 12/2015 |
| TW | 201723781 | A | 7/2017 |

* cited by examiner

TOUCH PANELS WITH FINGERPRINT IDENTIFICATION FILM LAYER AND TOUCH DEVICES

CROSS-REFERENCE TO RELATED APPLICATIONS

This application is a continuation of International Application No. PCT/CN2018/096868, filed on Jul. 24, 2018, which is based upon and claims priority to Chinese Patent Application No. 201711485114.X, filed on Dec. 29, 2017, the entire contents of which are incorporated herein by reference.

FIELD OF THE DISCLOSURE

The disclosure relates to display technologies, and in particular, to touch panels and touch devices.

BACKGROUND

In the prior art, integrating a fingerprint identification function into a display panel to enhance user experiences has already become a current technology trend.

Currently, in a display panel with a fingerprint identification function, a fingerprint identification module is generally arranged in a non-display area of the display panel, and is mostly arranged at a position corresponding to an exposed Home key, and collects fingerprint information of a user when the user touches the Home key with his/her finger. And then the fingerprint identification is completed based on the comparison result.

However, the fingerprint identification module being arranged in the non-display area will inevitably limit a full screen design of the display panel, which is disadvantageous to realize the full screen of the display panel.

Therefore, it is urgent to find a full screen solution that can realize fingerprint identification.

SUMMARY

Exemplary embodiments of the disclosure provide a touch panel and a touch device to solve the technical problem in the prior art of being not able to achieve a full screen solution in fingerprint identification.

Exemplary embodiments of the disclosure adopt the following technical solutions:

A touch panel, comprising a touch film layer and a fingerprint identification film layer, the touch film layer including at least one preset hollow, an orthographic projection of the fingerprint identification film layer on the touch film layer being located in at least one preset hollow area.

Preferably, the touch panel further comprises a display film layer, being provided with a plurality of illuminating sub-pixels arranged in an array;

The orthographic projection of the fingerprint identification film layer on the touch film layer does not overlap with an orthographic projection of the illuminating sub-pixel on the touch film layer.

Preferably, the fingerprint identification film layer comprises at least one first fingerprint identification pattern;

An orthographic projection of the first fingerprint identification pattern on the touch film layer is located at a gap of an orthographic projection of adjacent illuminating sub-pixels on the touch film layer.

Preferably, the display film layer is further provided with at least one blank sub-pixel, the fingerprint identification film layer comprises at least one second fingerprint identification pattern; and An orthographic projection of the second fingerprint identification pattern on the touch film layer overlaps with an orthographic projection of the blank sub-pixel on the touch film layer.

Preferably, the display film layer is provided with a plurality of blank sub-pixels, and the plurality of blank sub-pixels are evenly distributed between the illuminating sub-pixels.

Preferably, the touch panel further comprises wires connecting the fingerprint identification film layer, wherein an orthographic projection of wires on the touch film layer does not overlap with an orthographic projection of the illuminating sub-pixels on the touch film layer.

Preferably, the touch panel further comprises a touch driving chip, the touch driving chip being connected with the fingerprint identification by signal transmission lines, wherein the touch film layer includes a touch driving electrode arranged along a first direction, a touch inductive electrode arranged along a second direction, and the touch driving electrode and the touch inductive electrode are cross-insulated;

two ends of at least one specific electrode in the touch film layer are connected to the touch driving chip through the signal transmission lines, and the at least one specific electrode includes a touch driving electrode and/or a touch inductive electrode which are/is cut off by the preset hollow area.

Preferably, the fingerprint identification film layer comprises a fingerprint driving electrode arranged along a third direction, and a fingerprint inductive electrode arranged along a fourth direction, and the fingerprint driving electrode and the fingerprint inductive electrode are cross-insulated.

Preferably, a width of a gap between adjacent illuminating sub-pixels ranges from 10 µm to 50 µm; and a width of the fingerprint driving electrode and the fingerprint inductive electrode is within the range of the width of the gap.

A touch device comprises a touch panel including a touch film layer and a fingerprint identification film layer, the touch film layer including at least one preset hollow, an orthographic projection of the fingerprint identification film layer on the touch film layer being located in at least one preset hollow area.

The following advantageous effects may be achieved by at least one of the above technical solutions adopted by the exemplary embodiments of the disclosure:

In the touch panel provided by the disclosure, since at least one preset hollow area is arranged in the touch film layer, and the orthographic projection of the fingerprint identification film layer on the touch film layer is located in at least one preset hollow area of the touch film layer. In this way, no interference occurs between the two film layers, so that a full screen solution for fingerprint identification can be realized.

DETAILED DESCRIPTION OF PREFERRED EMBODIMENTS

To make an objective, technical solutions and advantages of the disclosure clearer, the technical solutions of the disclosure will be clearly and completely described in conjunction with specific embodiments of the disclosure and accompanying drawings.

Technical solutions provided by exemplary embodiments of the disclosure are described in detail below in conjunction with the accompanying drawings.

The disclosure provides a touch panel including a touch film layer and a fingerprint identification film layer, and an orthographic projection of the fingerprint identification film layer on the touch film layer is located in at least one hollow area in the touch film layer.

In the touch panel provided by the disclosure, since at least one preset hollow area is arranged in the touch film layer, and the orthographic projection of the fingerprint identification film layer on the touch film layer is located in at least one preset hollow area of the touch film layer, no interference occurs between the two film layers, so that a full screen solution for fingerprint identification can be realized.

A core concept of the touch panel provided by the disclosure is briefly described based on the above contents, and the concept of the disclosure will be described in detail below in specific embodiments.

Figure 1:
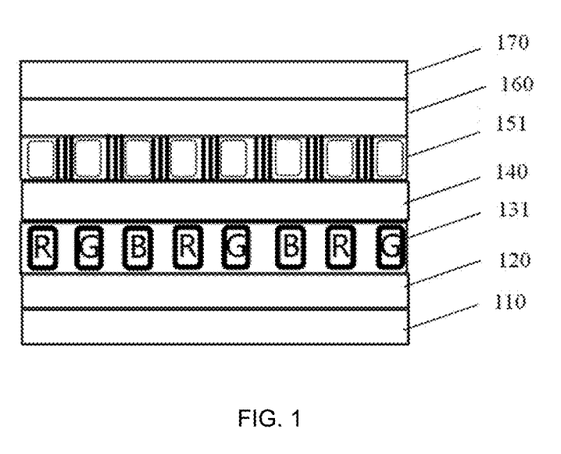
FIG. 1 is a schematic view of a first touch panel according to an exemplary embodiment of the disclosure.

FIG. 1 is a schematic view of a first kind of a touch panel according to an exemplary embodiment of the disclosure, including a touch film layer 151 and a fingerprint identification film layer, and an orthographic projection of the fingerprint identification film layer on the touch film layer is located in at least one hollow area in the touch film layer. In addition, the touch panel further includes a substrate 110, a thin film transistor (TFT) driving layer 120, a display film layer 131, a thin film encapsulation (TFE) film layer 140, and a touch film layer 151, a circular polarizer layer 160 and a protective layer 170 from bottom to top.

In an actual application, the fingerprint identification film layer may be one or more, and is arranged in a plurality of preset hollow areas of the touch film layer, which is not specifically limited in the disclosure.

Figure 3:
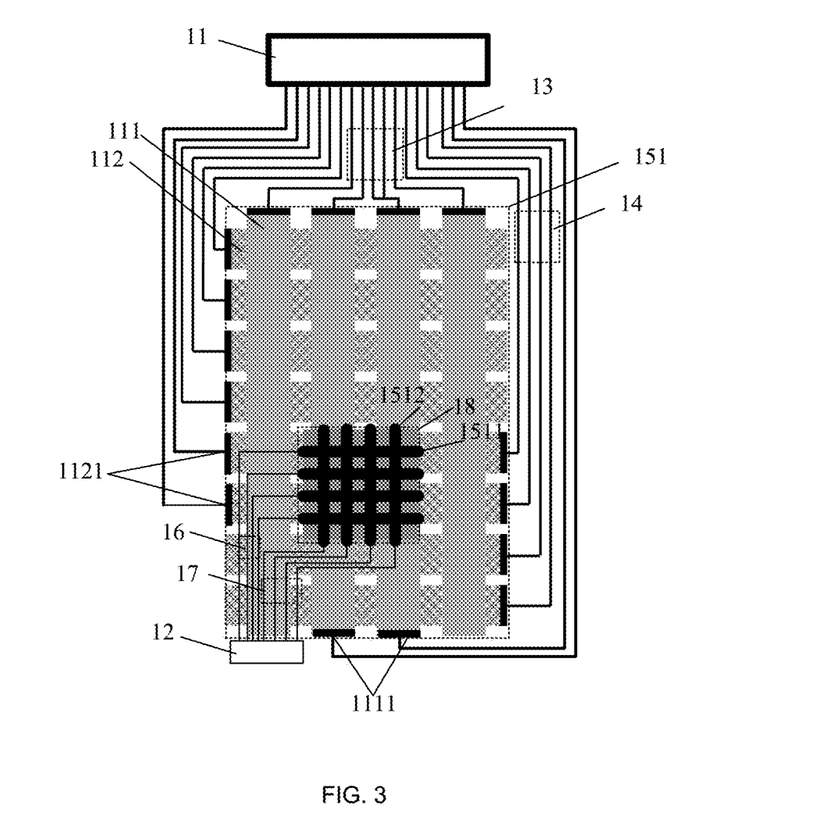
FIG. 3 is a schematic view of a touch film layer in a touch panel according to an exemplary embodiment of the disclosure.

FIG. 3 is a schematic view of a touch film layer according to an exemplary embodiment of the disclosure. The touch film layer 151 includes a touch driving electrode 111 arranged along a first direction, and a touch inductive electrode 112 arranged along a second direction. The touch driving electrode 111 and the touch inductive electrode 112 are cross-insulated; and two ends of at least one specific electrode of the touch film layer 151 are connected to a touch driving chip 11 through a signal transmission line, and the at least one specific electrode includes a touch driving electrode and/or a touch inductive electrode, which are cut off by a preset hollow area 18.

Optionally, as shown in FIG. 3, when at least one specific electrode includes the touch driving electrode and the touch inductive electrode, to ensure that a touch driving electrode 1111 and a touch inductive electrode 1121 which are cut off by the preset hollow area 18 are connected to the touch driving chip 11, two ends of at least one specific electrode of the above touch film layer 151 are connected to the touch driving chip 11 through a signal transmission line. Specifically, as shown in FIG. 3, two ends of a first specific electrode in the touch film layer are connected to the touch driving chip 11 through first signal transmission lines 13, and the first specific electrode is the touch inductive electrode 1111 which is cut off by the preset hollow area 18, and two ends of a second specific electrode in the touch film layer are connected to the touch driving chip 11 through second signal transmission lines 14. The second specific electrode is the touch inductive electrode 1121 which is cut off by the preset hollow area 18.

Figure 4:
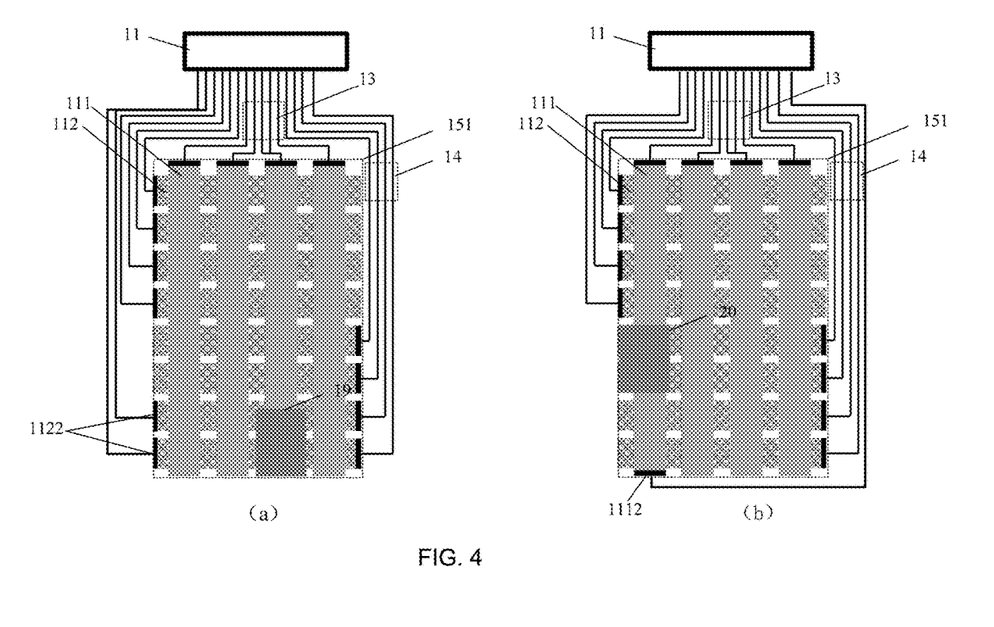
FIG. 4 is a schematic view of two positions of a preset hollow area in a touch display panel according to an exemplary embodiment of the disclosure.

Optionally, as shown in FIG. 4(a), when at least one specific electrode includes a touch inductive electrode which is cut off by a preset hollow area 19, it can be seen from FIG. 4(a) that the specific electrode which is cut off by the preset hollow area 19 is the touch inductive electrode 1122. Since a touch driving electrode removed by the preset hollow area 19 is located at an edge position of the touch film layer, and the preset hollow area 19 does not affect the touch driving electrode, only two ends of the touch inductive electrode 1122 which are cut off by the preset hollow area 19 are connected to a touch driving chip 11 through signal transmission lines, so as to prevent the touch inductive electrode 1122 which is cut off by the preset hollow area 19 from being disconnected from the control drive chip 11.

Optionally, as shown in FIG. 4(b), when at least one specific electrode includes a touch driving electrode which is cut off by a preset hollow area 20, it can be seen from FIG. 4(b) that the specific electrode which is cut off by the preset hollow area is a touch driving electrode 1112. Since the touch inductive electrode removed by the preset hollow area 20 is located at an edge position of the touch film layer, and the preset hollow area does not affect the touch inductive electrode, only two ends of the touch driving electrode 1112 which is cut off by the preset hollow area 20 are connected to a touch driving chip 11 through signal transmission lines, so as to prevent the touch driving electrode which is cut off by the preset hollow area 20 from being disconnected from the control drive chip 11.

Figure 2:
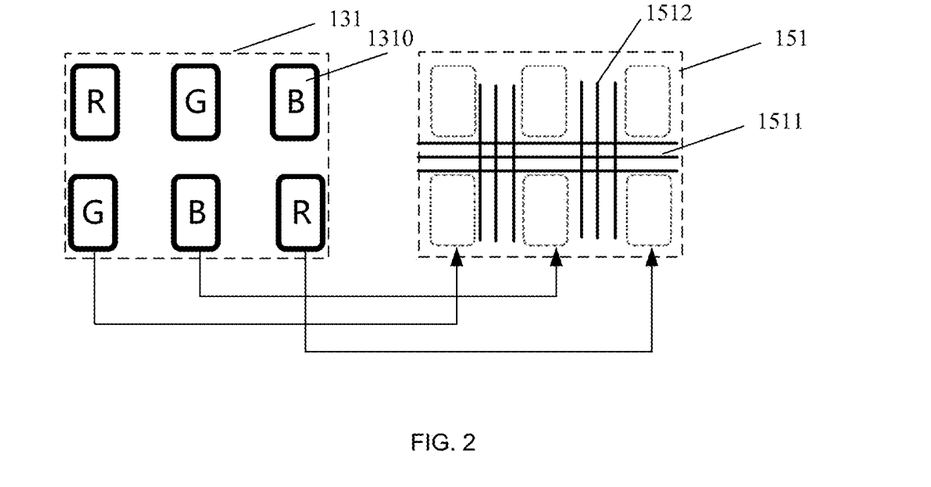
FIG. 2 is a schematic view of a display film layer and a touch film layer in a first touch panel according to an exemplary embodiment of the disclosure.

Optionally, a touch panel may further have a display function. Specifically, the touch panel may further include a display film layer 131. As shown in FIG. 2, a plurality of illuminating sub-pixels 1310, that is, "R", "G", and "B" shown in FIG. 2 are arranged in an array arrangement in the display film layer 131. In order to prevent the fingerprint identification pattern in the fingerprint identification film layer from blocking illuminating sub-pixels 1310 in the display film layer 13, an orthographic projection of the fingerprint identification film layer on the touch film layer in the exemplary embodiment of the disclosure, and an orthographic projection of the plurality of illuminating sub-pixels 1310 on the touch film layer do not overlap.

Optionally, exemplary embodiments of the disclosure provides a preferred implementation: the fingerprint identification film layer includes a first fingerprint identification pattern. In order to prevent the first fingerprint identification pattern from blocking illuminating sub-pixels 1310 in the display film layer 131 to further affect display of the display film layer 131, an orthographic projection of the first fingerprint identification pattern on the display film layer 131 may be located at a gap of adjacent illuminating sub-pixels in the display film layer 131. As shown in FIG. 2, the orthographic projection of the first fingerprint identification pattern on the display film layer 131 provided by the exemplary embodiment of the disclosure is located at a gap of adjacent illuminating sub-pixels in the display film layer 131. The first fingerprint identification pattern is formed by a fingerprint driving electrode 1511 arranged along a third direction and a fingerprint inductive electrode 1512 arranged along a fourth direction in FIG. 2.

In a practical application, since the fingerprint identification film layer includes a fingerprint driving electrode 1511 arranged along a third direction, and a fingerprint inductive electrode 1512 arranged along a fourth direction, and the fingerprint driving electrode 1511 and the fingerprint inductive electrode 1512 are cross-insulated. As shown in FIG. 2, in order to ensure sufficient identification sensitivity of the fingerprint identification film layer, line widths of the fingerprint driving electrode 1511 and the fingerprint inductive electrode 1512 in the fingerprint identification film layer cannot be too small. Therefore, a gap width of adjacent illuminating sub-pixels in exemplary embodiments of the disclosure may range from 10 µm to 50 µm, and line widths of a plurality of fingerprint driving electrodes 1511 and a plurality of fingerprint inductive electrodes 1512 in the fingerprint identification film layer should fall into the range of the gap width of adjacent illuminating sub-pixels. As shown in FIG. 2, a line width of at least three fingerprint driving electrodes 1511 or a line width of at least three fingerprint inductive electrodes 1512 in the fingerprint identification film layer should fall into the range of the gap width of adjacent illuminating sub-pixels.

In practical applications, in order to simplify manufacturing process, and satisfy the case that the orthographic projection of the first fingerprint identification pattern on the touch film layer is located at the gap of adjacent illuminating sub-pixels in the display film layer 131, the third direction and the fourth direction generally intersect at an angle of 90°, as shown in FIG. 2.

Optionally, the gap between adjacent illuminating sub-pixels 1310 in the display film layer 131 can't be too wide, which will affect display of the display film layer 131. In order to increase the identification sensitivity of the fingerprint identification film layer, line widths of the fingerprint driving electrode 1511 and the fingerprint inductive electrode 1512 of the fingerprint identification film layer in exemplary embodiments of the disclosure can't be too narrow. However, if line widths of the fingerprint driving electrode 1511 and the fingerprint inductive electrode 1512 of the fingerprint identification film layer are too wide, illuminating sub-pixels 1310 in the display film layer 131 will be affected, which in turn affects display of the display film layer 131. In an exemplary embodiment of the disclosure, in order to solve the problem, a driving voltage and a driving current of the display film layer may be increased, thereby increasing a brightness of each of the illuminating sub-pixels 1310 in the display film layer 131 to weaken the influence of the fingerprint identification film layer on the display film layer 131.

Figure 5:
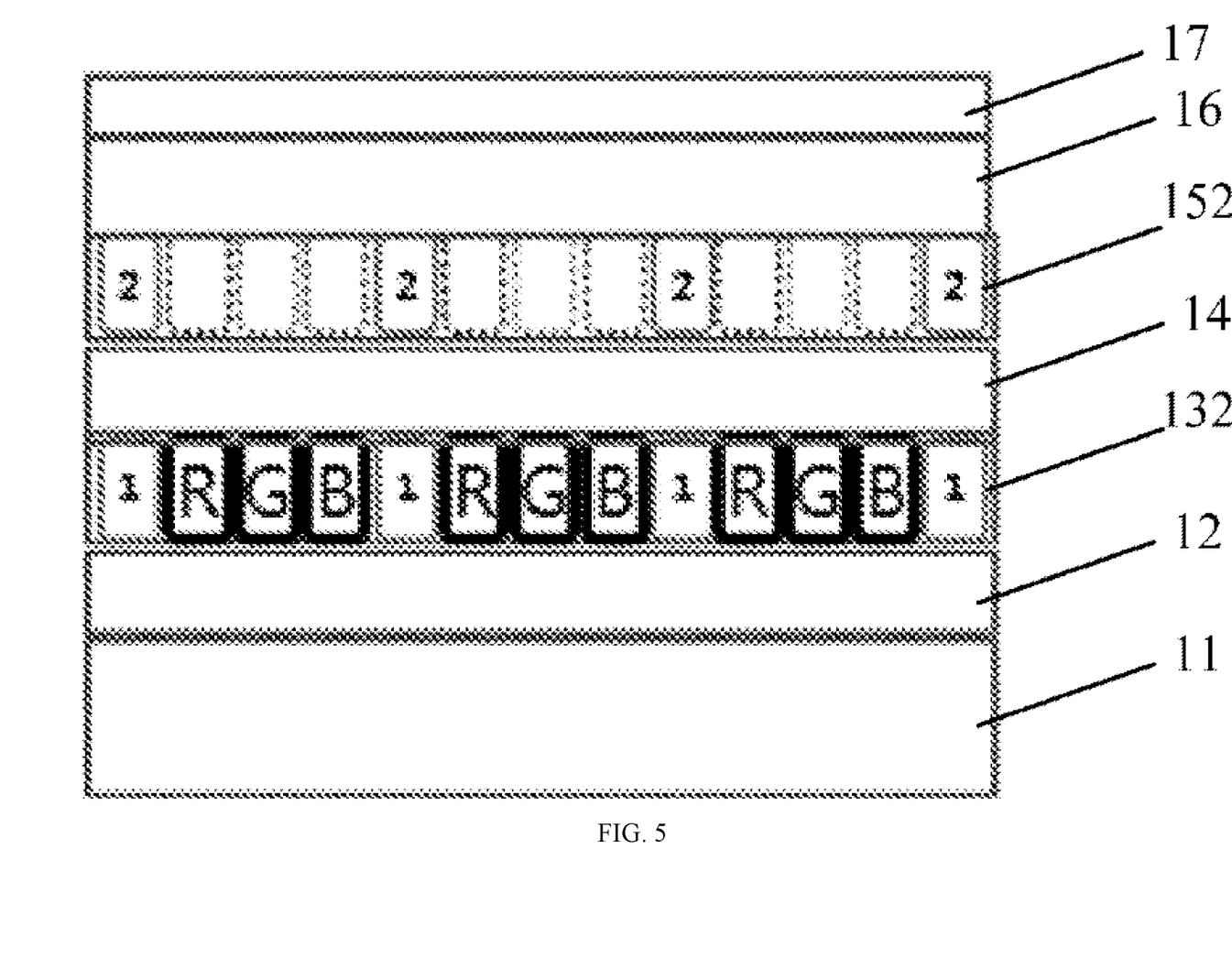
FIG. 5 is a schematic view of a second touch panel according to an exemplary embodiment of the disclosure.
Figure 6:
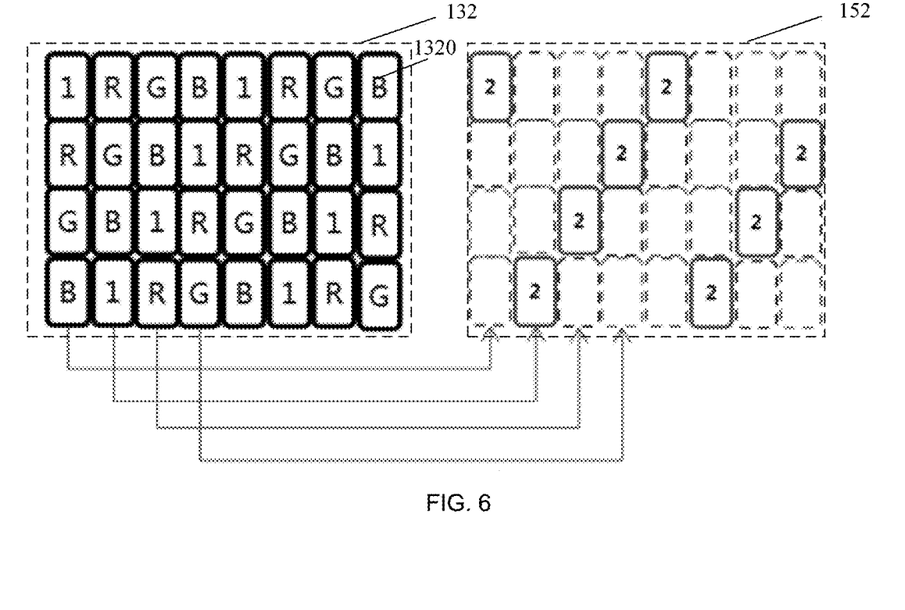
FIG. 6 is a schematic view of a display film layer and a touch film layer in a second touch panel according to an exemplary embodiment of the disclosure.

Due to limited gap width between adjacent illuminating sub-pixels in the display film layer, in consideration of the identification sensitivity of the fingerprint identification film layer, an exemplary embodiment of the disclosure also provides an optional implementation, in which a plurality of illuminating sub-pixels in the display film layer in the prior art are rearranged. As shown in FIG. 5 and FIG. 6, at least one blank sub-pixel 1 is arranged in illuminating sub-pixels of the display film layer, and at least one second fingerprint identification pattern 2 is included in the fingerprint identification film layer. In order to prevent the fingerprint identification pattern in the fingerprint identification film layer from blocking illuminating sub-pixels 1320 in a display film layer 132, an orthographic projection of the second fingerprint identification pattern 2 on the touch film layer overlap an orthographic projection of the blank sub-pixel 1 of the display film layer 132 on the touch film layer. That is, there is one-to-one correspondence between positions of the second fingerprint identification pattern 2 and the blank sub-pixel 1 in the display film layer 132, as shown in FIG. 6.

Figure 7:
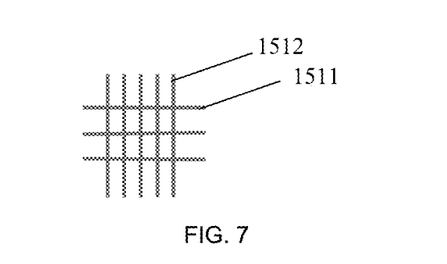
FIG. 7 is an enlarged schematic view of a second fingerprint identification pattern according to an exemplary embodiment of the disclosure.

As shown in FIG. 7, FIG. 7 is an enlarged schematic view of a second fingerprint identification pattern 2 which is formed by a fingerprint driving electrode 1511 arranged along a third direction and a fingerprint inductive electrode 1512 arranged along a fourth direction.

As shown in FIG. 5, FIG. 5 is a schematic view of a second touch panel provided by an exemplary embodiment of the disclosure. The second touch panel includes a touch film layer 152 and a fingerprint identification film layer 2 arranged in at least one preset hollow area of the touch film layer 152. In order to avoid affecting a display effect of the display film layer 132, a plurality of blank sub-pixels 1 may be arranged in the display film layer 132, and the blank sub-pixels 1 are evenly distributed between illuminating sub-pixels 1320 of the display film layer 132.

It should be noted that the structure of the first display panel and the structure of the second display panel may be combined with each other, that is, the above fingerprint identification film layer may include either a first fingerprint identification pattern or a second fingerprint identification pattern, as long as an orthographic projection of the first fingerprint identification pattern on the touch film layer is located at a gap of adjacent illuminating sub-pixels in the display film layer, and an orthographic projection of the second fingerprint identification pattern on the touch film layer and an orthographic projection of a blank sub-pixel on the touch film layer in the display film layer overlap. That is, some blank sub-pixels may be arranged in the display film layer on the basis of an array arrangement of an plurality of illuminating sub-pixels in the display film layer in the prior art.

As shown in FIG. 3, since the fingerprint identification film layer includes the fingerprint driving electrode 1511 and the fingerprint inductive electrode 1512, and the fingerprint driving electrode 1511 and the fingerprint inductive electrode 1512 are connected to the fingerprint drive chip 12 through a lead line. In order to prevent the lead line connecting the fingerprint driving electrode 1511 and the fingerprint inductive electrode 1512, that is, the wire connecting the fingerprint identification film layer, from blocking the illuminating sub-pixels in the display film layer, an orthographic projection of the lead line connecting the fingerprint identification film layer on the touch film layer in the embodiment of the disclosure and an orthographic projection of illuminating sub-pixels of the display film layer on the touch film layer do not overlap.

It should be noted that the touch driving chip 11 and the fingerprint drive chip 12 can be respectively a drive chip of the touch film layer and a drive chip of the fingerprint identification film layer, that is, the two drive chips are two different drive chips. The structure of the touch display panel can also be simplified to make the two drive chips encapsulated integrated, that is, the touch driving chip 11 and the fingerprint drive chip 12 can be an integrated drive chip.

In practical applications, the lead lines for connecting the fingerprint identification film layers tend to be as fine as possible, and a width thereof is less than 3 μm.

Optionally, in consideration of the complexity of manufacturing processes, the cost of the manufacturing, and the sensitivity, a material of the touch film layer and the fingerprint identification film layer in an exemplary embodiment of the disclosure includes at least one of the following: copper, silver, titanium, aluminum, molybdenum, or may also be a combination of the above materials.

In the touch panel provided by the disclosure, since at least one preset hollow area is arranged in the touch film layer, and the orthographic projection of the fingerprint identification film layer on the touch film layer is located in at least one preset hollow area of the touch film layer, no interference occurs between the two film layers, so that a full screen solution for fingerprint identification may be realized.

The disclosure further provides a touch device, which includes the touch panel described above.

The touch device may be, for example, an organic electroluminescent device, but is not limited thereto; it should fall into the scope of the disclosure as long as the orthographic projection of the fingerprint identification film layer of the touch panel on the touch film layer is located in at least one preset hollow area of the touch film layer.

In addition, the touch device can be any one of products or components with a display function, such as a mobile phone, a tablet computer, a television, a display, a notebook computer, a digital photo frame, a navigator, an intelligent wearable device, and the like. There may be other indispensable components of the touch device which are understood by those skilled in the art, and are neither described herein, nor should be construed as limitation to the disclosure.

The above is only exemplary embodiments of the disclosure which is not intended to limit the disclosure. And any modification, equivalent replacement or substitution made by those skilled in the art without departing from the spirit and principle of the disclosure should be included in the protection scope of the disclosure.

What is claimed is:

1. A touch panel, comprising a touch film layer and a fingerprint identification film layer, the touch film layer including at least one preset hollow, an orthographic projection of the fingerprint identification film layer on the touch film layer being located in at least one preset hollow area;
   wherein the touch panel further comprises a display film layer provided with a plurality of illuminating sub-pixels arranged in an array;
   wherein the display film layer is further provided with at least one blank sub-pixel, the at least one blank sub-pixel being arranged in the illuminating sub-pixels of the display film layer, the fingerprint identification film layer comprising at least one second fingerprint identification pattern; and
   wherein an orthographic projection of the second fingerprint identification pattern on the touch film layer overlaps with an orthographic projection of the blank sub-pixel on the touch film layer.

2. The touch panel according to claim 1, wherein the orthographic projection of the fingerprint identification film layer on the touch film layer does not overlap with an orthographic projection of the illuminating sub-pixels on the touch film layer.

3. The touch panel according to claim 2, wherein the fingerprint identification film layer comprises at least one first fingerprint identification pattern;
   an orthographic projection of the first fingerprint identification pattern on the touch film layer is located at a gap of an orthographic projection of adjacent illuminating sub-pixels on the touch film layer.

4. The touch panel according to claim 2, further comprising lead lines connecting the fingerprint identification film layer, wherein an orthographic projection of the lead lines on the touch film layer does not overlap with an orthographic projection of the illuminating sub-pixels on the touch film layer.

5. The touch panel according to claim 2, wherein a width of a gap between adjacent illuminating sub-pixels ranges from 10 μm to 50 μm; and a width of a fingerprint driving electrode and a fingerprint inductive electrode is within the range of the width of the gap.

6. The touch panel according to claim 1, wherein the display film layer is provided with a plurality of blank sub-pixels, and the plurality of blank sub-pixels are evenly distributed between the illuminating sub-pixels.

7. The touch panel according to claim 1, further comprising a touch driving chip connected with the fingerprint identification by signal transmission lines, wherein
   the touch film layer includes a touch driving electrode arranged along a first direction, and a touch inductive electrode arranged along a second direction, the touch driving electrode and the touch inductive electrode are cross-insulated;
   two ends of at least one specific electrode in the touch film layer are connected to the touch driving chip through the signal transmission lines, and the at least one specific electrode includes a touch driving electrode and/or a touch inductive electrode which are/is cut off by the preset hollow area.

8. The touch panel according to claim 1, wherein the fingerprint identification film layer comprises a fingerprint driving electrode arranged along a third direction, and a fingerprint inductive electrode arranged along a fourth direction, and the fingerprint driving electrode and the fingerprint inductive electrode are cross-insulated.

9. The touch panel according to claim 1, wherein the illuminating sub-pixels includes at least one of red sub-pixels, green sub-pixels, and blue sub-pixels.

10. The touch panel according to claim 1, wherein a size of the at least one blank sub-pixel is same as a size of the illuminating sub-pixels.

11. The touch panel according to claim 1, wherein there is one-to-one correspondence between positions of the at least one second fingerprint identification pattern and the at least one blank sub-pixel in the display film layer.

12. A touch device, comprising a touch panel including a touch film layer and a fingerprint identification film layer, the touch film layer including at least one preset hollow, an orthographic projection of the fingerprint identification film layer on the touch film layer being located in at least one preset hollow area;
   wherein the touch panel further comprises a display film layer provided with a plurality of illuminating sub-pixels arranged in an array;
   wherein the display film layer is further provided with at least one blank sub-pixel, the at least one blank sub-pixel being arranged in the illuminating sub-pixels of the display film layer, the fingerprint identification film layer comprising at least one second fingerprint identification pattern; and wherein an orthographic projection of the second fingerprint identification pattern on the touch film layer overlaps with an orthographic projection of the blank sub-pixel on the touch film layer.

* * * * *